J. H. BURKE.
RELISHING MACHINE.
APPLICATION FILED APR. 25, 1910.
967,495.
Patented Aug. 16, 1910.
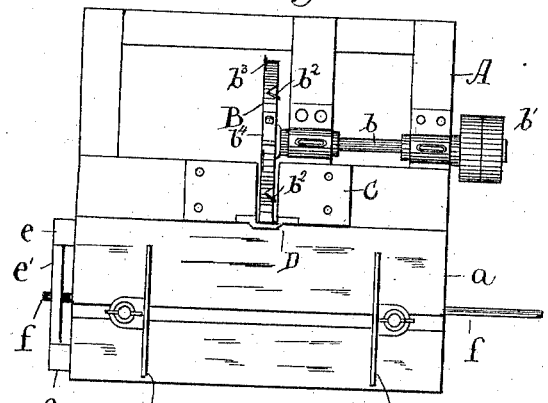
Fig. 1.
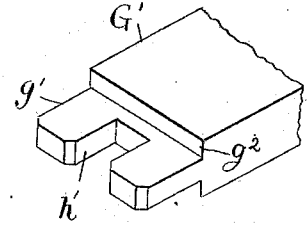
Fig. 6.
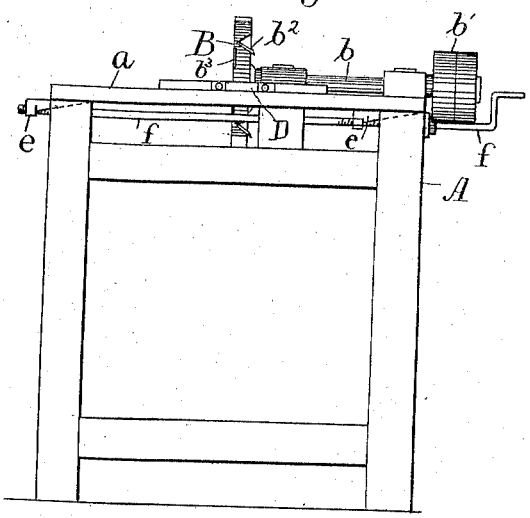
Fig. 2.
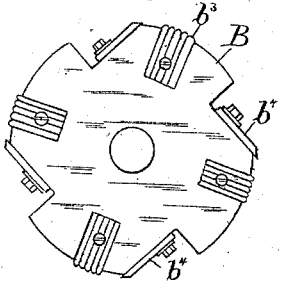
Fig. 3.
Fig. 4.
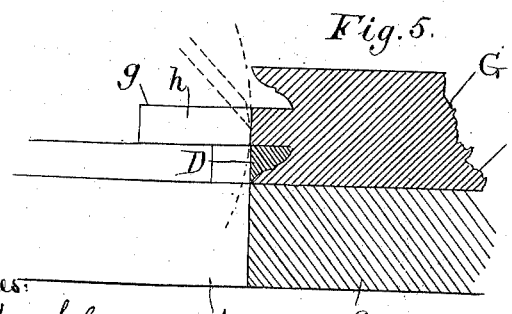
Fig. 5.
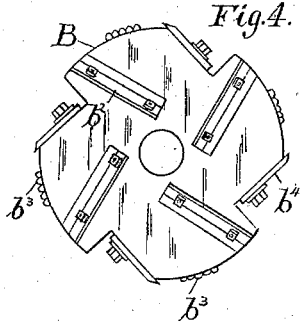
Witnesses:
E. M. Hinkley
Eleanor W. Dennis
Inventor:
Joseph H. Burke
by S. W. Bates
Atty.
THE NORRIS PETERS CO., WASHINGTON, D. C.

UNITED STATES PATENT OFFICE.

JOSEPH H. BURKE, OF PORTLAND, MAINE.

RELISHING-MACHINE.

967,495.  Specification of Letters Patent.  Patented Aug. 16, 1910.

Application filed April 25, 1910. Serial No. 557,325.

*To all whom it may concern:*

Be it known that I, JOSEPH H. BURKE, a citizen of the United States of America, and a resident of Portland, in the county of Cumberland, State of Maine, have invented certain new and useful Improvements in Relishing-Machines, of which the following is a specification.

My invention relates to a machine for relishing the tenon of door rails.

The operation of relishing door rails consists of cutting out a central section from the tenon extending from the outer end toward the base whereby the tenon is divided into two parts. Hitherto this operation has been done by sawing in from the end and cutting out the piece thus formed by means of a band saw or otherwise.

The object of my invention is to cut out this recess at one operation and the invention consists essentially of a cutter head having cutting knives on its periphery for cutting the base of the recess and lateral cutters for cutting the sides of the recess combined with a shearing block adjacent to the path of the peripherical knives and adapted to form with said knives a cutting or shearing edge to prevent the breaking down of the grain of the wood and the formation of chips.

I illustrate my invention by means of the accompanying drawing in which—

Figure 1 is a plan of a relishing machine embodying my invention, Fig. 2 is a front elevation of the same, Fig. 3 is an elevation of one face of the cutter head, Fig. 4 is an elevation of the opposite face of the cutter head, Fig. 5 is a sectional detail showing the action of the cutter head in cutting out the relish, and Fig. 6 is a perspective view of the end of a plain door rail after being relished.

Referring to the drawing, like letters of reference indicate like parts.

The mechanism is mounted on a suitable frame as A and the cutter head B is secured to the end of a shaft $b$ which is journaled in suitable bearing boxes on the frame A, the opposite end of the shaft, as shown, being provided with a driving pulley $b'$.

One form of door rail to which the relishing operation is applied is shown in Fig. 6 in which G' is the rail, $g'$ the tenon and $h'$ the relish recess which is to be cut out by this machine.

The relish is cut by the cutter head B which has a series of peripherical cutters $b^4$ secured to its outer edge for cutting the base of the relish recess. Lateral cutters are also provided for cutting the sides of the recess. As here shown, I provide on one side spur cutters $b^3$ of well known construction, and on the opposite face I provide a cutting knife $b^2$ set in the face and extending from the periphery well toward the center.

The formation of chips by the action of the cutters $b^4$ on the end of the grain of the wood is prevented by placing a shearing block on the table C, in such a position that the knives will revolve close to the face of the block and the two parts will coöperate to produce a smooth shearing cut and effectually prevent the breaking down of the wood and the formation of chips. As here shown, I secure a block D on the rear edge of the fixed table C, the block extending across the path of the peripherical cutters. The block is secured by its ends to the edge of the table by screws or otherwise and it has preferably a cross section where it comes opposite the cutter head formed to fit into the molding recess at the base of the tenon where cope doors or doors having the molding formed on the rails are used.

In Fig. 5 I have shown a section of a cope door rail G with its tenon $g$ and relish recess $h$, a molding recess being formed at the base of the tenon.

The upper surface of the block D is level with the upper surface of the table C and just the height of the under surface of the tenon as shown in Fig. 5.

When cope doors are relished, the relish recess extends in to the line of the outer edges of the molding recesses so that it is necessary to allow the rail to run in far enough to bring the cutting knives to this point. By forming the block as described and allowing it to enter the molding space, this may be done as shown in Fig. 5.

When plain rails such as those shown in Fig. 6 are worked, the relish recess does not extend in flush with the base of the tenon but stops a short distance from the base or shoulder. In that case, the square shoulder $g^2$ will come in contact with the outer corner of the block D leaving an uncut portion at the base of the tenon which is the width of the block D.

Means are provided for raising and lowering the body of the rail so that the tenon will just come over the upper surface of the block and as here shown, I provide a vertically adjustable table $a$ on which the body of the rail rests directly in rear of the table C.

Means are provided for raising and lowering the table $a$ to allow for rails of different thicknesses and as here shown, I support the table on four wedges $e$, one on each corner. Two of the wedges are connected by a bar $e'$ and the other two by a similar bar and a screw threaded adjusting rod $f$ connects the bars $e^2$ and the rod is so connected that by turning it all four wedges are moved in the same direction and the table raised or lowered.

By means of the vertical adjustment of the table $a$, the tenon will always rest directly on the upper surface of the block D whatever the thickness of the door rails.

Gages $j$ $j$ are provided on the table $a$ for the purpose of guiding the rails onto the cutter head. In relishing door rails, the gages are set to bring the cutter head in the right place with respect to the end of the tenon and the table $a$ is then adjusted so that the tenon will come flush with the top of the block D. The rail is then fed in until the shoulder $g^2$ comes against the block D. The outer corners of the tenon are chamfered off by touching them to the face of the cutter head containing the cutting knives $b^2$. In case the relish is to be cut wider than the ordinary size, it is moved laterally after being fed in allowing the lateral cutter $b^2$ to take out the side of the recess. In this manner relishes of any width may be cut in one operation without removing the rail from its position.

It will be seen that by the use of my machine, door rails may be relished quickly with one simple operation by simply feeding the rail endwise to the machine and I thus do away with the slow and expensive operations hitherto used in this work. The chamfering of the tenons is quickly done by the lateral cutters by simply touching the corners to the face of the cutter head, thus saving much time over the old method of doing it by hand or with another machine.

I claim:—

1. In a machine for relishing door rails, the combination of a cutter head having peripherical knives for cutting the base of the relish, lateral cutting knives for cutting the sides of the relish and a shearing block upon which the tenon rests and adapted to form with the peripherical knives a cutting or shearing edge.

2. In a machine for relishing door rails, the combination of a cutter head having peripherical knives for cutting the base of the relish and lateral cutting knives on one of the faces of the cutter head extending from the periphery toward the center for cutting the sides of the relish and a shearing block upon which the tenon rests and adapted to form with the peripherical knives a cutting or shearing edge.

3. In a machine for relishing door rails, the combination of a cutter head having peripherical knives for cutting the base of the relish, lateral cutting knives for cutting the sides of the relish and a shearing block having a cross section adapted to fit within the molding recess of the door rail and to form with the peripherical knives a cutting element.

In witness whereof I have hereunto set my hand this 18th day of April, 1910.

JOSEPH H. BURKE.

Witnesses:
   S. W. BATES,
   ELEANOR W. DENNIS.